United States Patent
Ramprasad

(10) Patent No.: US 11,653,188 B2
(45) Date of Patent: *May 16, 2023

(54) DATA CONNECTION SETTING APPLICATION

(71) Applicant: TracFone Wireless, Inc., Miami, FL (US)

(72) Inventor: Satish Ramprasad, Miami, FL (US)

(73) Assignee: TRACFONE WIRELESS, INC., Miami, FL (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/329,486

(22) Filed: May 25, 2021

(65) Prior Publication Data

US 2021/0281989 A1    Sep. 9, 2021

Related U.S. Application Data

(63) Continuation of application No. 15/008,039, filed on Jan. 27, 2016, now Pat. No. 11,019,472.

(60) Provisional application No. 62/106,986, filed on Jan. 23, 2015.

(51) Int. Cl.
*H04W 4/50* (2018.01)
*H04M 1/72448* (2021.01)

(52) U.S. Cl.
CPC .......... *H04W 4/50* (2018.02); *H04M 1/72448* (2021.01)

(58) Field of Classification Search
CPC ........................... H04W 4/50; H04M 1/72448
See application file for complete search history.

(56) References Cited

U.S. PATENT DOCUMENTS

| | | |
|---|---|---|
| 8,555,273 B1 | 10/2013 | Chia et al. |
| 2003/0212991 A1 | 11/2003 | Mahajan |
| 2008/0046521 A1 | 2/2008 | Yanagi et al. |
| 2008/0288585 A1 | 11/2008 | Choi et al. |
| 2010/0136960 A1 | 6/2010 | Knezevic |
| 2011/0086670 A1 | 4/2011 | Shin |
| 2012/0233357 A1 | 9/2012 | Chen et al. |
| 2014/0007019 A1 | 1/2014 | Saukko et al. |
| 2014/0161042 A1 | 6/2014 | Shaw et al. |
| 2015/0358283 A1 | 12/2015 | Halabi |
| 2016/0029204 A1 | 1/2016 | Lalwaney |
| 2017/0265125 A1 | 9/2017 | Osterwise et al. |

*Primary Examiner* — Pei Yong Weng

(57) ABSTRACT

A method for configuring access point network settings using a data connection setting application operating on a wireless device is disclosed. The data connection setting application is operable to accesses settings configuration and data from a memory and/or a SIM card, and compare it with wireless network requirements to determine whether the settings need to be reconfigured. Based on the determination, the data connection setting application can enable the display of instructions to a user and provide tools to fill in information required to reconfigure the wireless device according to wireless network requirements for the specific wireless device.

20 Claims, 7 Drawing Sheets

400

| | 402 | 404 |
|---|---|---|
| | Data Type | Data |
| 406 | Name | US – Tracfone Web |
| 408 | APN | Att.mnvo |
| 410 | Proxy | - |
| 412 | Port | - |
| 414 | Username | - |
| 416 | Password | - |
| 418 | Server | - |
| 420 | MMSC | - |
| 422 | MMS Proxy | - |
| 424 | MMS Port | - |
| 426 | MMS Protocol | Wap 2.0 |
| 428 | MCC | - |
| 430 | MNC | - |
| 432 | Authentication Type | PAP |
| 434 | APN Type: | supl |

| | Instructions |
|---|---|
| 502 | In the App list Clock Settings |
| 504 | Tap Cellular |
| 506 | Delete any existing APN Settings |
| 508 | Tap "Add Internet APN" |
| 510 | Tap APN and type in att.mnvo |
| 512 | Tap Username and type in |
| 514 | Tap Password and type in |
| 516 | Tap Save |
| 518 | Tap "Add MMS APN" |
| 520 | Tap APN and type in att.mnvo |
| 522 | Tap Username and type in |
| 524 | Tap password and type in |
| 526 | Tap WAP getaway (URL) and type in proxy.mvno.tracfone.com |
| 528 | Tap WAP gateway port and type in 80 |
| 530 | Tap MMSC (URL) and type in http://mmsc.cingular.com |
| 532 | Tap MMSC Port and type in... |
| 534 | Tap Max MMS Size and type in... |
| 536 | Tap IP Type and select: IPv4v6 |
| 538 | Tap save |

Figure 5

DATA CONNECTION SETTING APPLICATION

CROSS REFERENCE TO PRIOR APPLICATIONS

This application is a continuation of U.S. application Ser. No. 15/008,039 filed Jan. 27, 2016, now U.S. Pat. No. 11,019,472, issued May 25, 2021; which application claims the benefit from U.S. Provisional Application No. 62/106,986 filed on Jan. 23, 2015, which is hereby incorporated by reference for all purposes as if fully set forth herein.

TECHNICAL FIELD

The following disclosure generally relates to a configuration application for a wireless device and, more particularly, relates to a method and system for a data connection setting application installed on a wireless device.

BACKGROUND

A large number of wireless service plans exist for customers desiring wireless services such as data, talk, text messaging, and the like. To obtain these wireless services, customers generally have the option of entering into a post-paid service, e.g., contract for a period of time, or a pre-paid, contract-free service with a wireless provider. The latter offers customers the freedom to initiate and stop wireless services without incurring expensive cancellation fees associated with a post-paid service.

Companies that provide post-paid wireless services are wireless carriers or Mobile Network Operators (MNO) that maintain and control their own wireless networks. A mobile virtual network operator (MVNO) is a wireless communications services provider that does not own the wireless network infrastructure over which the MVNO provides services to its customers. An MVNO enters into a business agreement with a mobile network operator to obtain bulk access to network services at wholesale rates, then sets retail prices independently.

The services provided by both the MNOs and MVNOs often implement subscriber identity module cards, also commonly known as subscriber identification module (SIM) cards, to identify and authenticate subscribers on wireless devices. These SIM cards store network specific information used to authenticate and identify subscribers on one or more wireless networks. Generally network specific information contained in SIM cards can include one or more of a Network Identifier, a Mobile Country Code (MCC), a Mobile Network Code (MNC), an ICCID, an IMSI, an Authentication Key, a Local Area Identity, and an Operator-Specific Emergency Number. The SIM also stores other carrier-specific data such as the SMSC (Short Message Service Center) number, Service Provider Name (SPN), Service Dialing Numbers (SDN), Advice-Of-Charge parameters and Value Added Service (VAS) applications which can function for the sale and activation and/or addition of a wireless service, e.g. talk airtime, data, or text messaging.

Traditionally, most wireless devices (e.g. cellular phones) were generally configured to be compatible with a particular wireless provider's network only. This was done by configuring the settings of a wireless device for a specific network configured SIM card with identifiers and networks codes that would limit the wireless device's connectivity to that specific network and/or provide connectivity to other networks only with control of that specific wireless network.

More recently, some wireless providers have allowed customers to bring their own wireless device and/or transfer their existing telephone number to their networks. This option allows customers to switch wireless providers without the burden and cost of having to purchase a new wireless device. Further, customers are generally no longer limited to certain brands or model numbers for a particular network and can generally choose other brands and models that had been limited to a particular wireless network. To achieve this however, customers must go through a series of steps to change data connection settings, i.e., to modify the phone to operate on the desired network, so that the specific wireless device can function with the network of the selected wireless provider. The configuration steps can greatly differ depending on the wireless device and the provider.

Convenience, timeliness, and reliability of the wireless providers' systems are key factors that play into a user's experience. By developing a system to improve at least these factors, a more positive experience can be provided to the user. The improved experience will help retain customer base and increase the number of customers willing to purchase wireless services from particular MNOs and MVNOs. In order to do so, the following various needs must be addressed by enabling new improved systems that can be implemented to configure wireless devices for the activation of a wireless service by a wireless provider.

A need exists to decrease the steps required for customers to transfer their wireless device to a different wireless network. In particular, a solution for a simplified and safe way to configure wireless devices is desired.

Another need in the art also exists for an error free and more expedient method and system for customers to transfer their wireless devices to a particular network.

A further need exists in the art for a method, system and application to enable customers to transfer their wireless devices in convenient locations, including transient locations, in an expedited manner. For example, without the need to visit a physical location or call customer support to transfer the wireless device which can be time consuming for the subscriber and not available at any time. Further, using a website to purchase additional usage requires that the subscriber recalls or searches for the address of the website and navigates through a series of webpages.

Accordingly, a more convenient, secure, and time efficient approach is needed for transferring wireless devices to specific networks.

SUMMARY

Currently, many wireless devices can download applications specific to the operating system of the wireless device to perform a multitude of tasks, such as playing games, editing documents, checking email, and purchasing goods and/or services. Such applications are readily accessible on home pages of the wireless devices and enable a user of the wireless device to quickly perform popular functionalities. According to one aspect of the disclosure, the user can securely transfer his/her wireless device to a particular network in an expedited manner by using a mobile application that can facilitate the configuration of specific network settings according to the wireless device upon the replacement of a SIM card in the wireless device.

According to one aspect of the disclosure, a method for programming access point name settings using an application operating on a wireless device is disclosed. The method including: receiving, at the application operating on the wireless device, data associated with the access point name settings correlated to one or both of the wireless device and a wireless provider; accessing wireless device settings using the application operating on the wireless device; determining, using the application operating on the wireless device, that the data received and the accessed wireless device settings are not compatible; and enabling presentation, on a display of the wireless device and using the application operating on the wireless device, instructions to a user for a change of one or more settings of the wireless device.

According to additional aspects of the disclosure, a wireless device comprising at least one processor in communication with at least one memory, configured to: receive, at an application operating on the wireless device and from a SIM card replaced on the wireless device, data correlated to one or both of the wireless device and a wireless provider; access, using the application operating on the wireless device, settings information associated with the wireless device; determine, using the application operating on the wireless device, that the data received and the settings information accessed are not compatible without modification of the settings associated with the wireless device; and enable presentation, on a display of the wireless device and using the application operating on the wireless device, instructions to a user for a change of one or more settings of the wireless device, is disclosed.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DESCRIPTION OF DRAWINGS

The above mentioned features and aspects of the disclosure will become more apparent with reference to the following description taken in conjunction with the accompanying drawings wherein like reference numerals denote like elements and in which:

FIG. 4 illustrates an exemplary data setting database structure according to an aspect of the disclosure;

FIG. 5 illustrates an exemplary graphical representation of instructions displayed to a user for the configuration of the settings using the data connection setting application according to an aspect of the disclosure;

DETAILED DESCRIPTION

In this specification and claims it is to be understood that reference to a wireless device is intended to encompass electronic devices such as mobile phones, tablet computers, gaming systems, MP3 players, personal computers, PDAs, and the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone." With respect to remote alert devices, data transmission over a wireless network, including on a pre-paid basis using a SIM card, is contemplated for alarm fobs, wireless remote camera devices, vehicle monitoring systems, home based security systems that don't require a landline or use both a landline and a wireless network for added reliability, and similar systems where the wireless device can require programming specific for the wireless network selected.

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network or communication channel as defined herein that may utilize the teachings of the present application to sell, activate, monitor, and/or redeem wireless services by providing for the setting of wireless device parameters for a selected network.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not for other aspects.

Figure 1:
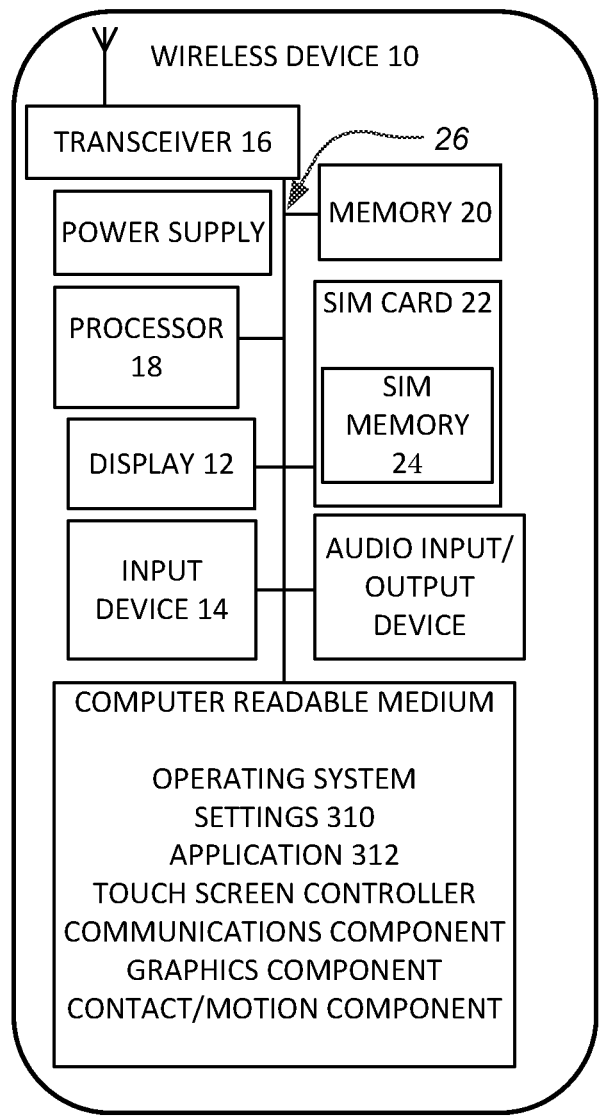
FIG. 1 illustrates a block diagram of an exemplary wireless device that may implement an aspect of the disclosure.

FIG. 1 illustrates a block diagram of an exemplary wireless device. Referring now to FIG. 1, a block diagram of an exemplary wireless device is illustrated. As previously mentioned, the wireless device 10 can be any mobile technology computing device that connects to a wireless communication network such as, for example, a mobile phone, a wireless handset, a wireless dongle, user equipment, a mobile station, a wireless security device, or the like. The wireless device 10 includes a display 12, an input device 14, a transceiver 16, a processor 18, a memory 20, and may include a Universal Integrated Circuit Card ("UICC") or Subscriber Identity Module ("SIM") card hereinafter SIM card 22. In some implementations, the SIM card 22 can be removably received within a card slot in the wireless device 10 and can include internal SIM memory 24. The SIM card 22 can store identification information such as an International Mobile Subscriber Identity ("IMSI"), a key used to identify and authenticate subscribers using the wireless device 10, a unique serial number (ICCID), an international mobile subscriber identity (IMSI), security authentication, ciphering information, information related to a network, list of services the user has access to, unlocking pins, and the like. In a wireless device 10 that does not utilize a SIM card 22, similar data may be stored in the memory 20. The SIM card 22 can be configured to be transferred between different wireless devices 10.

The processor 18 is capable of processing instructions for execution within the wireless device 10. For example, the processor 18 can process instructions stored in the memory 20 to display graphical information on the display 12 and/or to transmit or receive data using the transceiver 16. In some implementations, the processor 18 can process application instructions to display a data connection setting application on the display 12 upon the replacing of the SIM card 22. In a wireless device 10 that does not utilize a SIM card 22, the data connection setting application may be executed manually or otherwise.

The processor 18 can be a single-threaded processor or a multi-threaded processor. The memory 20 can include, for example, volatile or non-volatile random access memory ("RAM") and/or read only memory ("ROM"). The display 12, input device 14, transceiver 16, processor 18, and memory 20 within the wireless device 10 can communicate through an internal bus 26.

Figure 2:
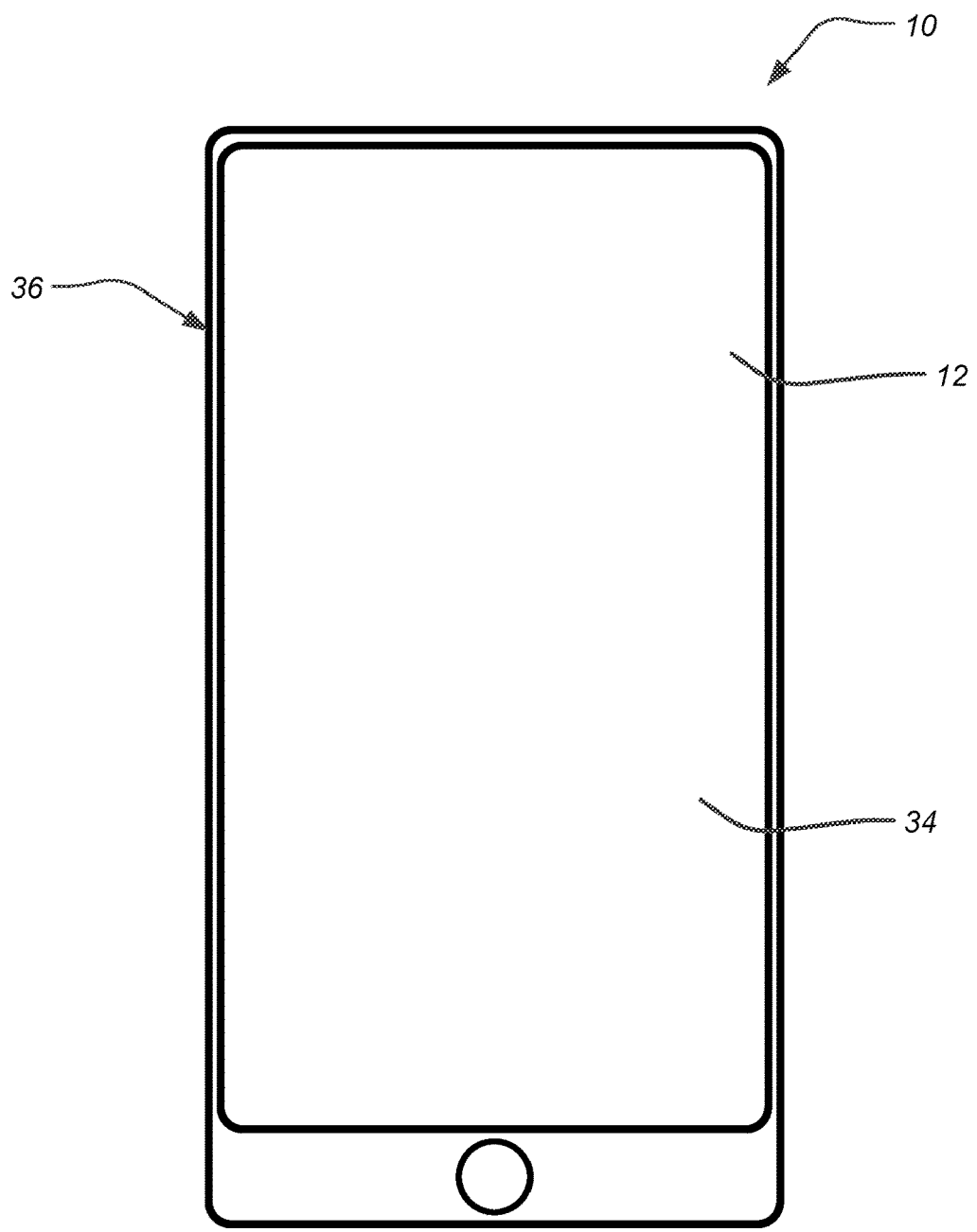
FIG. 2 illustrates an exemplary wireless device that may implement an aspect of the disclosure.

FIG. 2 illustrates an exemplary wireless device. Referring now to FIG. 2, an exemplary wireless device is illustrated. The wireless device 10 may include a display 12 that is a screen that can be touch sensitive. The input device 14 can include one or more of a keypad (not shown), a trackball (not shown), selectable buttons (not shown), a touch screen 34 having selectable regions, or the like. The wireless device 10 may also include an antenna (not shown) coupled to the transceiver 16 to facilitate the transmission and receipt of communications by the wireless device 10. A card slot 36 may be used for placement of a SIM card 22 and may be located, for example, on the side of the wireless device or behind the battery. Circuitry located inside the card slot 36 can provide electrical communication between the SIM card 22 and the wireless device 10 processor 18.

Figure 3:
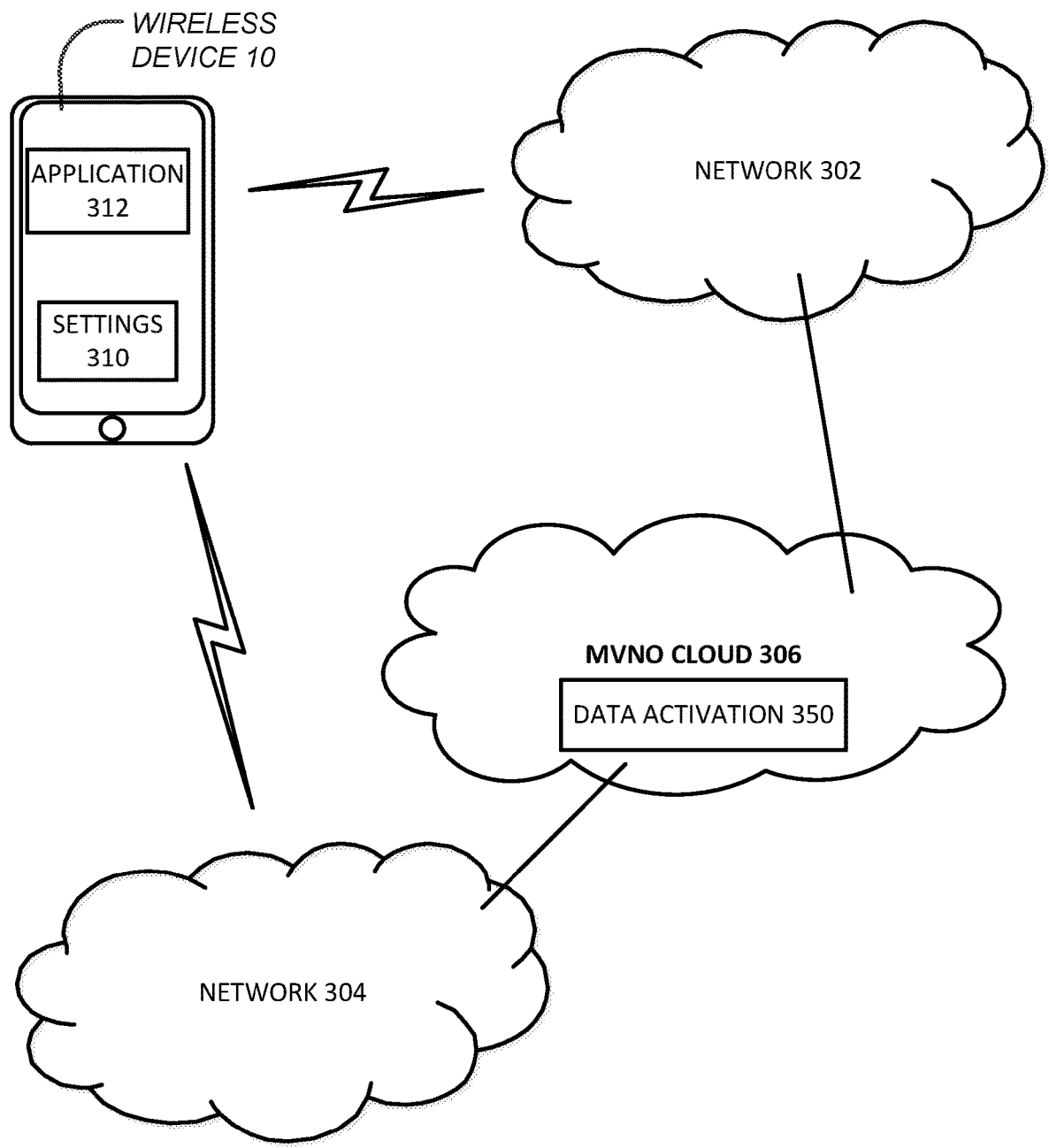
FIG. 3 illustrates a schematic diagram showing the connectivity between a wireless device, a plurality of mobile network operators, and a mobile virtual network operator that may implement an aspect of the disclosure.

FIG. 3 illustrates a schematic diagram showing the connectivity between a wireless device, a plurality of mobile network operators, and a mobile virtual network operator. Referring now to FIG. 3, a schematic diagram showing the connectivity between a wireless device 10, a plurality of mobile network operators ("MNO") networks 302 and 304, and a mobile virtual network operator ("MVNO") cloud 306 is illustrated. The MVNO cloud 306 may include a wireless data activation system 350 that includes one or more databases with wireless device 10 configuration requirements. Accordingly, when a wireless device 10 is replaced with a new SIM card 22, i.e., customer seeks to activate a wireless device 10 needing wireless configuration, the settings of the wireless device 10 may need to be correlated to the wireless provider's networks 302, 304, and/or the SIM card 22 for activation.

Although two MNO networks 302 and 304 are illustrated in FIG. 3, any number of MNO networks can be available. The wireless device 10 may connect to one of the MNO networks 302 and 304 depending on the geographic location of the wireless device 10, the availability of the MNO networks 302 and 304, and/or the service contract associated with the wireless device 10. The MNO networks 302 and 304 can be any type of wireless network, such as a cellular data network, e.g., a Global System for Mobile Communication ("GSM") network, a Code-Division Multiple Access ("CDMA") network, a Universal Mobile Telecommunications System ("UMTS") network, an Evolution-Data Optimized ("EV-DO") network, a LTE network, a wireless local network, a wide area network, or the like.

In some implementations, for example, a wireless subscriber purchases a wireless communications plan from a MVNO and elects to bring a wireless device 10 that was previously set for a different wireless network. Although the MVNO can be a wireless operator that typically does not own its own frequency spectrum or have its own network infrastructure and the MVNOs contract for the right to access a wireless communications network owned by a MNO, the user may buy that access and use the wireless communication network after the wireless device 10 is modified with settings 310 for use with the MNO network. Settings 310 may be configured according to the network with the use of the data connection setting application 312 functioning as described throughout the present description. For example, to be able to bring their own wireless device 10, users may need to reconfigure the settings 310 of the wireless device 10 so that the device can function according to the SIM card 22, which can contain information corresponding to the MVNO's operating system.

The MVNO cloud 306 can be one or more of dedicated hardware, application specific integrated circuits, programmable logic arrays, computers, and servers including one or more processors and one or more memories. The wireless data activation system 350 can be implemented as one or more of software and hardware and may manage the services provided by the MVNO to the wireless subscribers. In some implementations, the wireless data activation system 350 provides and/or enables at least some of the functions of the data connection setting application 312.

Settings 310 can be correlated, for example, to communicate with a tracking module (not shown) which may also be used to identify the wireless device 10 and/or the particular wireless subscriber using the wireless device 10 by transmitting identification information with the wireless device 10 and/or the wireless subscriber. For example, the identification information can include an identification number for the wireless subscriber or an identification number for the SIM card 22 associated with the wireless subscriber, such as an Integrated Circuit Card Identification ("ICCID"), Electronic Serial Number ("ESN"), International Mobile Equipment Identity ("IMEI"), International Mobile Subscriber Identity ("IMSI"), Local Area Identity ("LAI"), or the like. The identification information can be specific to allow the MVNO to identify the wireless device 10 and/or wireless subscriber.

In some implementations, to avoid compromising the integrity of the identification information and the usage information, the information transmitted can be stored in a secure memory 20 of the wireless device 10 and/or encrypted according to settings required by the network provider. For example, the identification and usage information can be provided to the tracking module in encrypted form and/or according to a specific network protocol.

The data connection setting application 312 may be a software application that can enable simplified configuring of settings 310 of the wireless device 10 according to the MNO network 302. For example, settings configuration may be required depending on the wireless device 10 for usage of wireless services, activate data transmission, change his/her wireless communications plan from the MVNO, purchase additional usage of wireless services from the MVNO, access other applications for download and/or purchase, purchase and/or receive information on international wireless services, receive customer service including real-time troubleshooting services, find retailers, receive information on promotions from the MVNO, receive advertisements from the MVNO, and the like.

The data connection setting application 312 included in the wireless device 10 may be pre-installed or post-installed on the wireless device 10 and can be updated over time using Over The Air ("OTA") programming or non-OTA programming. For example, the wireless subscriber using the wireless device 10 can choose to install the data connection setting application 312 on the wireless device 10 at any time using a local area network connection (e.g. WI-FI connection). The data connection setting application 312 may be stored or executed on, for example, the memory 20, the internal SIM memory 24, dedicated hardware, application specific integrated circuits, programmable logic arrays, and/or the processor 18 of the wireless device 10. The data connection setting application 312 may be specific to and run by the operating system of the wireless device 10.

In one exemplary implementation, the data connection setting application 312 may be used to receive wireless device settings. The settings may be received from a user, through an interface, or may be previously recorded and transmitted, for example, from the memory 20. The wireless device settings information may be forwarded, through the data connection setting application 312, to the service provider. The service provider may determine, through a test protocol, whether the wireless device 10 settings correspond to the particular wireless device 10 being activated. Depending on whether the wireless device 10 needs additional programming, the service provider may enable additional actions, such as, additional programming to allow transfer of the particular wireless device 10. Other additional actions may include, for example, sending database updates that correspond to the wireless device 10 to the data connection setting application 312.

FIG. 4 illustrates an exemplary data setting database structure. Referring now to FIG. 4, an exemplary data setting database structure 400 is illustrated. In particular, the data setting database 400 includes an exemplary set of information necessary to setup the data of an ANDROID™ operating system ("OS") wireless device 10. The disclosure contemplates application with other types of operating systems and other types of wireless devices and accordingly the information is merely exemplary and may be modified as needed.

The data setting database structure 400 may include a data type field 402 and a data field 404. Although one data field 404 is illustrated in FIG. 4 corresponding to a single wireless device 10, any number of data fields can be stored in the data setting database structure 400 depending on the manufacturer and/or type of device. Other wireless devices including different OS types requiring setup may include, for example an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

For some of the OS, settings may include but are not limited to the exemplary data included in entries 406-434. Any alphanumeric data can be stored in the entries 406-434 depending on what is required to configure the specific wireless device's settings for the activation of wireless services. As represented, name 406, APN 408, MMS Protocol 426, Authentication Type 432, and APN Type 434, may be entries that require corresponding settings according to the specific wireless network selected by the user. In the present example, the corresponding settings can be provided by a MVNO provider for an Android OS using the data connection setting application 312. The settings may be stored in a database and transmitted to the data connection setting application 312 or alternatively form part of the application. Alternatively, the Proxy 410, Port 412, Username 414, Password 416, Server 418, MMSC 420, MMS Proxy 422, MMS Port 424, MCC 428, and MNC 430 entries may be advanced settings that require some user input for configuration. Although user input may be required for some of the settings, the application can be configured to be engaged and facilitate copying and pasting of information and/or storing and transposing settings information previously entered. In some aspects, the data connection setting application 312 may also provide default settings according to the wireless network, wireless device type, and/or wireless service being activated for those advanced settings.

FIG. 5 illustrates an exemplary graphical representation of instructions displayed to a user for the configuration of the settings using the data connection setting application according to the disclosure. Referring now to FIG. 5, exemplary instructions 500 displayed to a user for the configuration of the settings using the data connection setting application 312 are depicted in graphical representation 500. According to some aspects of the disclosure, the instructions 500 may be tailored to a specific wireless device and network by the data connection setting application 312. Implementations of aspects of the disclosure can include but are not limited to the specific instructions 502-538 presented. For example, the exemplary specific instructions 502-538 may correspond to the manual setting of a WINDOWS MOBILE8™ wireless device 10 and enabled by the data connection setting application 312 to be presented on a display 12. In some aspects, the instructions 502-538 may additionally or alternatively be narrated using a speaker of the wireless device 10.

Instructions 502-538 may be presented as steps or as a list. Moreover, instructions to tap may be contemplated for touch screen devices that may serve as a user interface. However, for other wireless devices 10, a keyboard may be used alternatively instructing the user to press and/or select an option. Further, in some aspects, the data connection setting application 312 may enable the user to provide settings selections by speaking into a microphone of the wireless device 10. In additional aspects, the data connection setting application 312 may provide suggested inputs based on previously recorded and/or downloaded information. In yet additional aspects, the data connection setting application 312 may also allow the user to copy and paste selections, for example from a user's preferences database or from the wireless provider, to facilitate and ensure accuracy of the entries.

Figure 6:
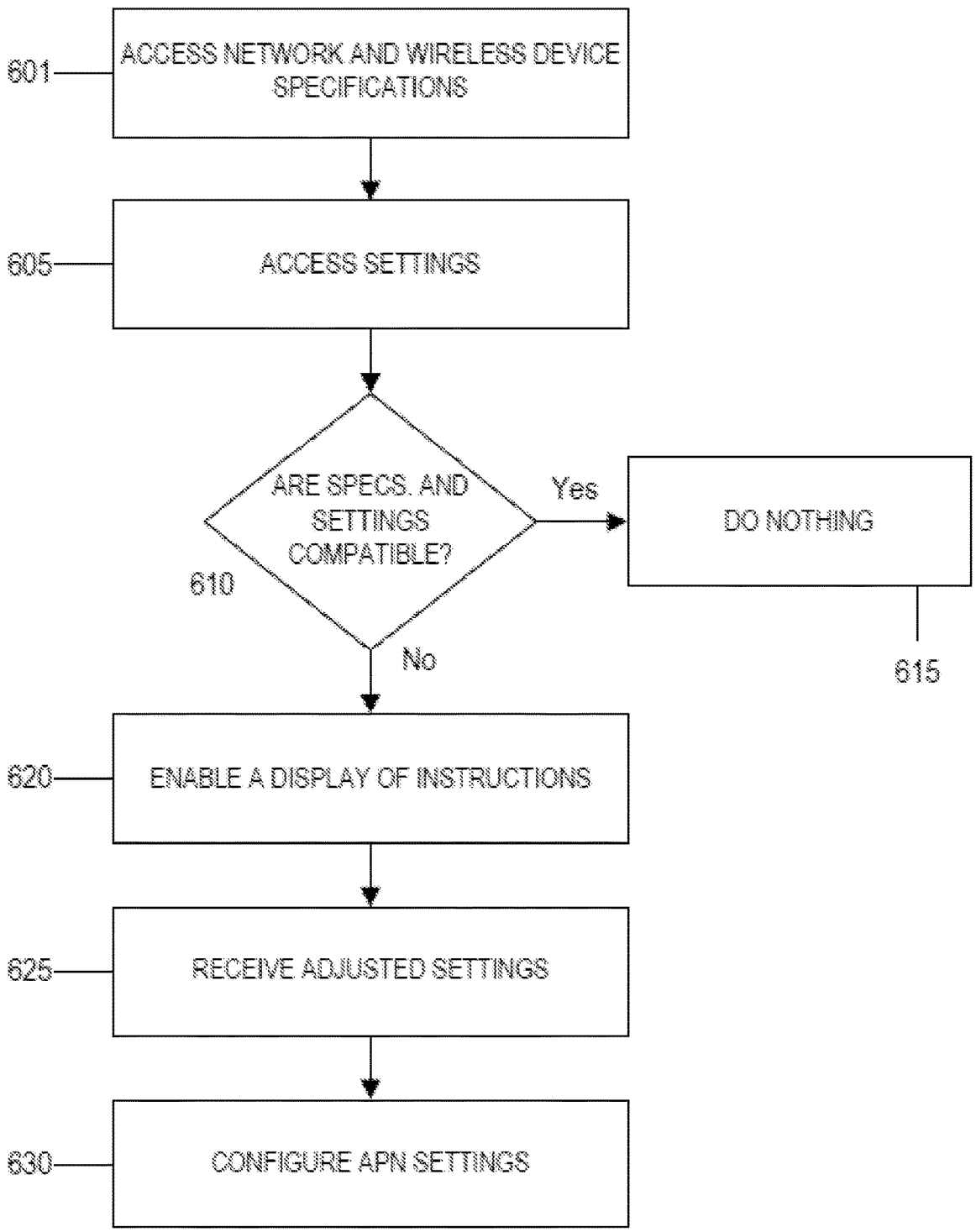
FIG. 6 illustrates a flowchart showing an exemplary process for displaying wireless device settings information to a user on a wireless device according to an aspect of the disclosure.

FIG. 6 illustrates a flowchart showing an exemplary process for displaying wireless device setting information to a user on a wireless device according to the disclosure. Referring now to FIG. 6, an exemplary process for displaying wireless device settings information on a wireless device 10 to a user is depicted in a flowchart 600. In particular, steps to enable displaying of information by the data connection setting application 312 in accordance to aspects of the present disclosure. At step 601, the data connection setting application 312 can access one or both of: network specifications and wireless device specifications. Accessing of specifications may occur, for example, after a SIM card has been replaced in a wireless device 10, once the wireless device is powered on, and/or upon selection by a user.

At step 605, settings of the wireless device 10 may be accessed from a memory 20 in communication with the processor 18 executing the data connection setting application 312. Settings of the wireless device may include but are not limited to access point name settings received from the SIM card 22 loaded on the wireless device. In some aspects, other settings may be previously stored and retrieved from a memory 20 in communication with the processor 18 of the wireless device 10. At least some of the access point name settings may be downloaded automatically from the SIM card 22 and/or the memory 20, after the SIM card 22 is inserted into the wireless device 10 or the wireless device 10 is first powered on, for example.

At step 610, a determination of whether the accessed settings of the wireless device 10 are compatible with the wireless device specifications for the network selected is made. The determination may be made by matching access point settings accessed to a predetermined database specific to the wireless device specifications for that wireless network. The database may form part of the data connection setting application 312. In some aspects, the database may be "in the cloud" and only accessed by the application for the compatibility determination. At step 615, if it is determined that the network and wireless device specifications are compatible with the settings, the data connection setting application may do nothing or present the user with an indication that the wireless device 10 is ready for use.

Alternatively, at step 620, when a determination that the accessed settings are not compatible with the wireless device specifications for the wireless network is made, the data connection setting application 312 can generate and/or enable a display of instructions on a display 12 of the wireless device 10. Instructions displayed can direct a user to do one or more of: download updates, copy and paste information to configure the access point name settings, make a selection using an interface by entering, tapping, clicking, pressing, and the like, speak a selection into a speaker, and answer preference questions. Actions by the user may then be used to configure new adjusted settings according to the wireless device provider's requirements for that specific wireless device.

At step 625, the adjusted settings can be received by the data connection setting application. In some aspects, the application may run test protocols to confirm that the adjusted settings are compatible for the selected wireless provider. At step 630, the access point name settings are configured/saved into the wireless device for use. Optionally, after the settings are configured, an indication that the wireless device is ready for use on the selected network may be provided to the user. The indication may include the display of a message, a sound, a vibration, or a combination thereof, according to the user's preferences.

Figure 7:
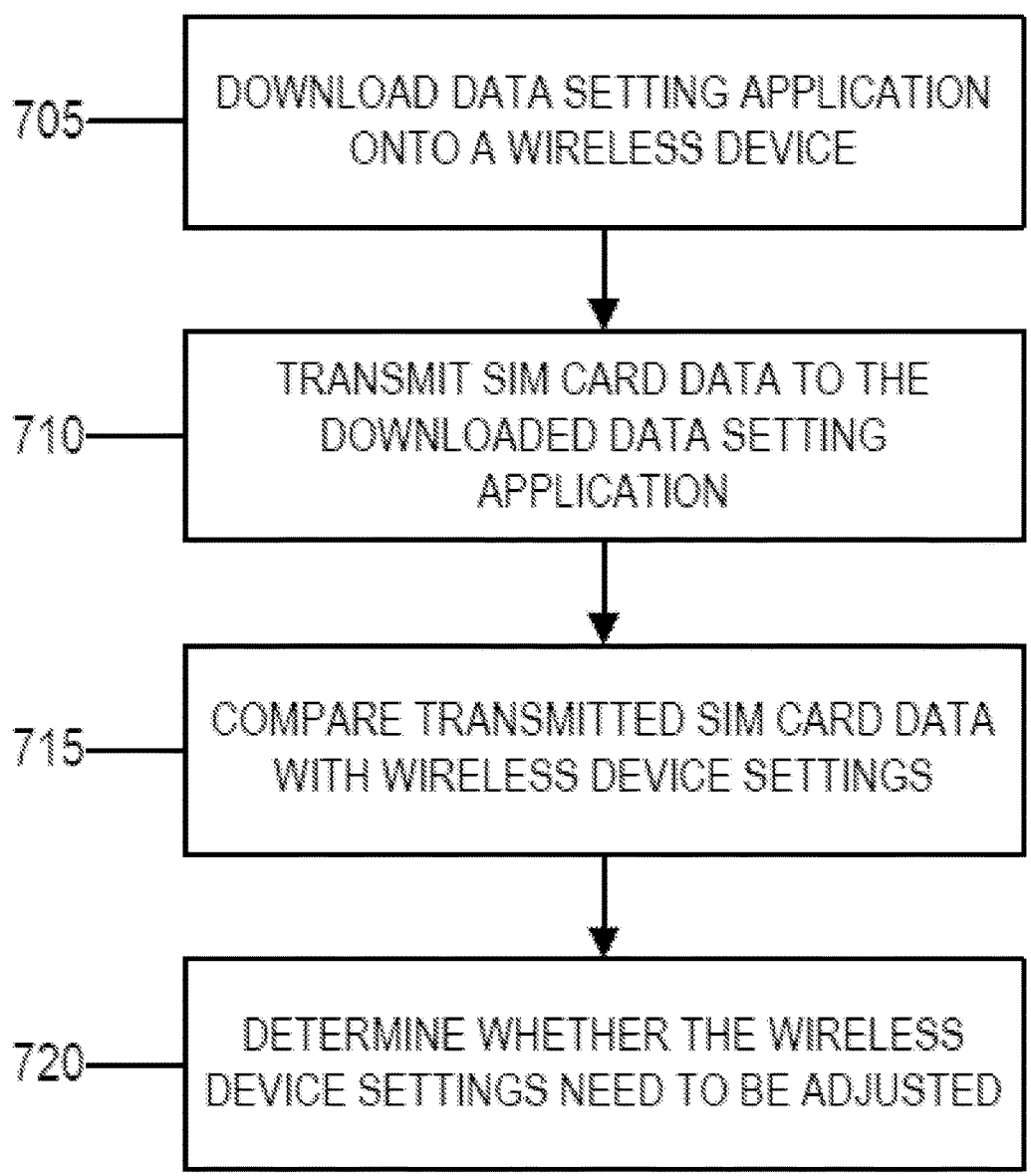
FIG. 7 illustrates a flowchart showing an exemplary process for configuring settings on a wireless device according to received SIM card data according to an aspect of the disclosure.

FIG. 7 illustrates a flowchart showing an exemplary process for configuring settings on a wireless device according to received SIM card data according to the disclosure. Referring now to FIG. 7, a flowchart 700 showing an exemplary process for configuring settings on a wireless device according to received SIM card data is shown. In particular, the flowchart 700 includes steps that can enable certain aspects of the present disclosure. Beginning at step 705, the user may download the data connection setting application 312 onto the wireless device 10. It can be preferred that the data connection setting application be downloaded by the user and not be pre-loaded as this can allow the data connection setting application 312 to be specific for a particular wireless network reducing the amount of information it must process and therefore occupying less space in the memory 20. At step 710, data can be transmitted from the SIM card to the downloaded data connection setting application 312. The SIM card can store network specific information used to authenticate and identify subscribers on one or more wireless networks. Generally network specific information contained in SIM cards can include the ICCID, IMSI, Authentication Key, Local Area Identity, and Operator-Specific Emergency Number. The SIM also stores other carrier-specific data such as the SMSC (Short Message Service Center) number, Service Provider Name (SPN), Service Dialing Numbers (SDN), Advice-Of-Charge parameters and Value Added Service (VAS) applications which can function for the sale and activation and/or addition of a wireless service, e.g. talk airtime, data, or text messaging.

At step 715, the transmitted data may be compared with the wireless device settings. At step 720, the comparison can be used to determine whether the configuration settings are acceptable for use or need readjusting of the configuration settings. If readjusting of the settings is needed, the data connection setting application 312 may be used to reconfigure the settings according to the previously described systems and steps.

A number of implementations have been described. Nevertheless, it will be understood that various modifications may be made without departing from the spirit and scope of the claims. For example, the wireless device 10 may not utilize a UICC or SIM card 22. The wireless device 10 may operate using any mobile operating system. The internally stored rules of operation of the wireless device 10 may be changed together with other wireless devices via a broadcast message received from the MVNO.

Although for the sake of clarity and simplicity, exemplary implementations of the disclosure are described in terms of a wireless device 10 used in a MVNO communications system, it should be understood that the disclosure is not limited to these exemplary implementations. Accordingly, other implementations are also within the scope of this application.

The disclosure as described herein decreases the steps required for customers to transfer their wireless device to a different wireless network. In particular, the disclosure provides a solution for a simplified and safe way to configure wireless devices. Additionally, the disclosure provides for an error free and more expedient method and system for customers to transfer their wireless devices to a particular network. Furthermore, the disclosure provides a method, system and application to enable customers to transfer their wireless devices in convenient locations, including transient locations, in an expedited manner. For example, without the need to visit a physical location or call customer support to transfer the wireless device which can be time consuming for the subscriber and not available at any time. Finally, the disclosure provides a more convenient, secure, and time efficient approach for transferring of wireless devices to specific networks.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a," "an," and "the" include plural referents unless the content clearly indicates otherwise. Thus, for example, reference to "a wireless device 10" includes two or more wireless devices.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

Reference to "one implementation," "some implementations," "other implementations," or "one or more implementations" means that a particular feature, structure, or characteristic described in connection with the implementation is included in at least one implementation but not necessarily in the same implementation or separate implementations that are mutually exclusive. Moreover, various features may be exhibited by some implementations and not by other implementations. Similarly, various requirements are described that may be requirements for some implementations but not other implementations.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™ Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

As previously stated, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various aspects of the disclosure, the methods described herein are intended for operation with dedicated hardware implementations including, but not limited to, wireless devices, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method of programming access point name settings using a data connection setting application implemented on a wireless device, comprising:
   accessing, at the data connection setting application operating on the wireless device, specifications that comprise at least the access point name settings correlated to one or both of the wireless device and a wireless provider in response to at least one of the following: a SIM card has been replaced in the wireless device, the wireless device is powered on, or upon selection by a user;
   accessing wireless device settings from a memory of the wireless device using the data connection setting application operating on the wireless device, the wireless device settings comprising at least access point name settings;
   determining, using the data connection setting application operating on the wireless device, that the specifications and the accessed wireless device settings that comprise at least the access point name settings are not compatible by comparing the wireless device settings accessed to the specifications, the specifications being specific to the wireless device for a wireless network;
   generating, on a display of the wireless device using the data connection setting application operating on the wireless device, instructions to a user to change wireless device settings of the wireless device that comprise at least the access point name settings when the wireless device settings are not compatible;
   receiving in the wireless device new wireless device settings that comprise at least the access point name settings;
   receiving, at the data connection setting application operating on the wireless device, inputs from a user in response to the instructions on the display that comprises the new wireless device settings that comprise at least the access point name settings;
   configuring the wireless device with the data connection settings application operating on the wireless device with the new wireless device settings that comprise at least the access point name settings; and
   storing the new wireless device settings of the wireless device that comprise at least the access point name settings,
   wherein the inputs from a user include data associated with the access point name settings copied from a database of the data connection setting application operating on the wireless device.

2. The method of programming access point name settings of claim 1, wherein the determination that the specifications associated with access point name settings and the accessed wireless device settings are not compatible is made by accessing a database including wireless device access point name settings recorded for different types of wireless devices.

3. The method of programming access point name settings of claim 1, additionally comprising:
   starting the data connection setting application operating on the wireless device upon detection of replacement of a SIM card,
   wherein the configuring the wireless device with the new wireless device settings is executed to enable use of one or more of the following: a wireless data service, a wireless multimedia messaging service, a wireless short message service, and a wireless airtime service.

4. The method of programming access point name settings of claim 1, additionally comprising:
   prompting the user to authorize downloading of updates of the data connection setting application.

5. The method of programming access point name settings of claim 4, wherein the updates include updated databases including wireless device settings.

6. The method of programming access point name settings of claim 1, wherein at least some data associated with the access point name settings is received from the SIM card loaded on the wireless device.

7. The method of programming access point name settings of claim 6, wherein the data associated with the access point name settings received from the SIM card is transmitted automatically to the data connection setting application operating on the wireless device.

8. The method of programming access point name settings of claim 1, further comprising:
   storing, in a memory of the wireless device, user information associated with at least one or both of a user and a wireless service subscription.

9. The method of programming access point name settings of claim 8, further comprising:
   transmitting the stored user information to the data connection setting application on the wireless device.

10. The method of programming access point name settings of claim 9, additionally comprising:
    presenting, on the display of the wireless device and using the data connection setting application, of at least some of the stored user information to the user for a confirmation.

11. The method of claim 1, wherein the wireless device comprises one of the following: a mobile phone, a smart phone, a tablet, and a PDA.

12. The method of programming access point name settings of claim 1, wherein:
    at least some data associated with the access point name settings is received from the SIM card loaded on the wireless device;
    the data associated with the access point name settings received from the SIM card is transmitted automatically to the data connection setting application operating on the wireless device; and
    the determination that the specifications associated with access point name settings and the accessed wireless device settings are not compatible is made by accessing a database including wireless device access point name settings recorded for different types of wireless devices.

13. The method of programming access point name settings of claim 1, additionally comprising:
    starting the data connection setting application operating on the wireless device upon detection of replacement of a SIM card; and
    prompting the user to authorize downloading of updates of the data connection setting application,
    wherein the updates include updated databases including wireless device settings.

14. The method of programming access point name settings of claim 1, further comprising:

storing, in a memory of the wireless device, user information associated with at least one or both of a user and a wireless service subscription;

transmitting the stored user information to the data connection setting application on the wireless device; and presenting, on the display of the wireless device and using the data connection setting application, of at least some of the stored user information to the user for a confirmation, wherein the configuring the wireless device with the new wireless device settings is executed to enable use of one or more of the following: a wireless data service, a wireless multimedia messaging service, a wireless short message service, and a wireless airtime service.

15. A wireless device comprising at least one processor in communication with at least one memory, wherein the at least one processor is configured to:

access, at a data connection setting application operating on the wireless device and from a memory in the wireless device, specifications that comprise at least access point name settings correlated to one or both of the wireless device and a wireless provider in response to at least one of the following: a SIM card has been replaced in the wireless device, the wireless device is powered on, or upon selection by a user;

access, using the data connection setting application operating on the wireless device, wireless device settings from a memory of the wireless device using the data connection setting application operating on the wireless device, the wireless device settings comprising at least access point name settings;

determine, using the data connection setting application operating on the wireless device, that the specifications and the accessed wireless device settings that comprise at least the access point name settings are not compatible by comparing the wireless device settings accessed to the specifications, the specifications being specific to the wireless device for a wireless network;

generate, on a display of the wireless device and using the data connection setting application operating on the wireless device, an indication to a user to change wireless device settings of the wireless device that comprise at least the access point name settings when the wireless device settings are not compatible;

receive an input, from a wireless device interface, by the user in response to the indication presented on the display;

transfer the new wireless device settings that comprise at least the access point name settings stored in a memory in digital communication with the processor to configure the wireless device;

receive in the wireless device new wireless device settings that comprise at least the access point name settings;

configure the wireless device with the data connection settings application operating on the wireless device with the new wireless device settings that comprise at least the access point name settings; and store the new wireless device settings of the wireless device.

16. The wireless device of claim 15, wherein the memory includes a memory of a SIM card that has been replaced in the wireless device.

17. The wireless device of claim 15, wherein:

at least some data associated with the access point name settings is received from the SIM card loaded on the wireless device;

the data associated with the access point name settings received from the SIM card is transmitted automatically to the data connection setting application operating on the wireless device; and the determination that the specifications associated with access point name settings and the accessed wireless device settings are not compatible is made by accessing a database including wireless device access point name settings recorded for different types of wireless devices.

18. The wireless device of claim 15, wherein the at least one processor is configured to:

execute, at the data connection setting application operating on the wireless device, a test protocol to verify the new wireless device settings that comprise at least the access point name settings allow porting of the wireless device to a network of the wireless provider.

19. The wireless device of claim 15, wherein the at least one processor is configured to:

store, in a memory of the wireless device, user information associated with at least one or both of a user and a wireless service subscription.

20. The wireless device of claim 19, wherein the at least one processor is configured to:

control transmitting the stored user information to the data connection setting application on the wireless device.

* * * * *